US009124142B2

(12) United States Patent
Vassilieff et al.

(10) Patent No.: US 9,124,142 B2
(45) Date of Patent: Sep. 1, 2015

(54) INDUCTIVE CHARGING DEVICE FOR A PORTABLE APPARATUS INCORPORATING A NEAR-FIELD COMMUNICATION ANTENNA

(75) Inventors: Youri Vassilieff, Toulouse (FR); Mohamed Cheikh, Toulouse (FR); Alexandru Takacs, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 449 days.

(21) Appl. No.: 13/604,664

(22) Filed: Sep. 6, 2012

(65) Prior Publication Data
US 2013/0093387 A1    Apr. 18, 2013

(30) Foreign Application Priority Data
Oct. 12, 2011    (FR) ...................................... 11 03107

(51) Int. Cl.
*H02J 7/00*    (2006.01)
*H02J 17/00*    (2006.01)
*H01F 38/14*    (2006.01)
*H04B 5/00*    (2006.01)

(52) U.S. Cl.
CPC ................ *H02J 17/00* (2013.01); *H01F 38/14* (2013.01); *H04B 5/0037* (2013.01); *H04B 5/0075* (2013.01); *H04B 5/0081* (2013.01); *H01F 2038/143* (2013.01)

(58) Field of Classification Search
USPC .................................................. 320/137, 108
See application file for complete search history.

(56) References Cited

U.S. PATENT DOCUMENTS

| 2009/0102419 A1* | 4/2009 | Gwon et al. | 320/108 |
| 2011/0025265 A1* | 2/2011 | Mochida et al. | 320/108 |
| 2011/0140671 A1* | 6/2011 | Kim et al. | 320/137 |
| 2013/0113422 A1* | 5/2013 | Lee et al. | 320/108 |

FOREIGN PATENT DOCUMENTS

KR    2009 0027312    3/2009

OTHER PUBLICATIONS

French Search Report dated Feb. 22, 2012, corresponding to the Foreign Priority Application No. 1103107.

* cited by examiner

*Primary Examiner* — Brian Ngo
(74) *Attorney, Agent, or Firm* — Young & Thompson

(57) ABSTRACT

An inductive charging device (20) for a portable apparatus for an automobile vehicle including at least one charging antenna (70) for inductive charging of the WPC type having a cut-out at its center (62) together with one communication antenna (60) for near-field communication of the NFC type, situated around the at least one charging antenna, along the sides of the charging device (Z1, Z2, Z3, Z4) and including at least one winding, the device being such that:
on at least one of the sides of the charging device, the communication antenna forms at least one loop (B) having at least one crossing point (61) on its base, the communication antenna having at least an upper part (63) surrounding the center of the cut-out of the charging antenna,
the upper part of the loop of the communication antenna surrounding the center of the cut-out has at least one winding.

16 Claims, 7 Drawing Sheets

Figure 1:
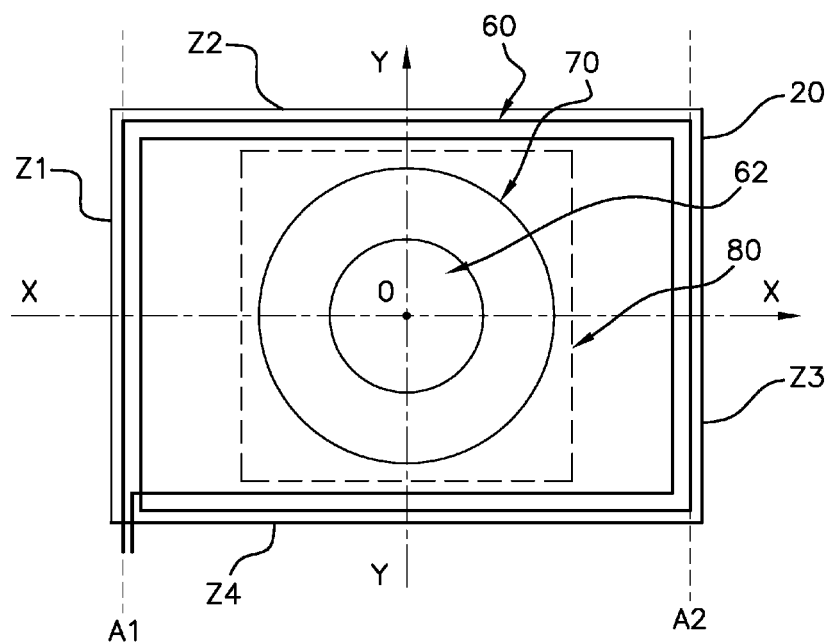

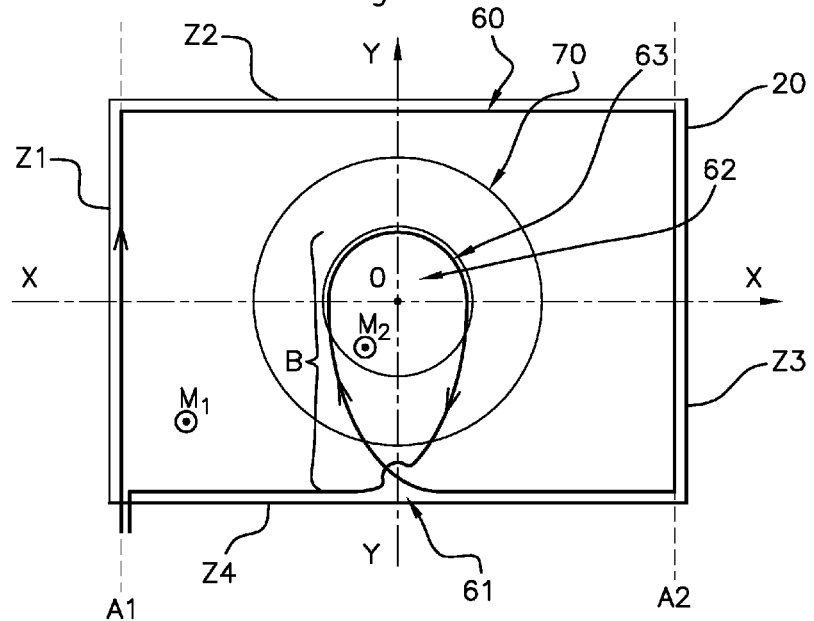
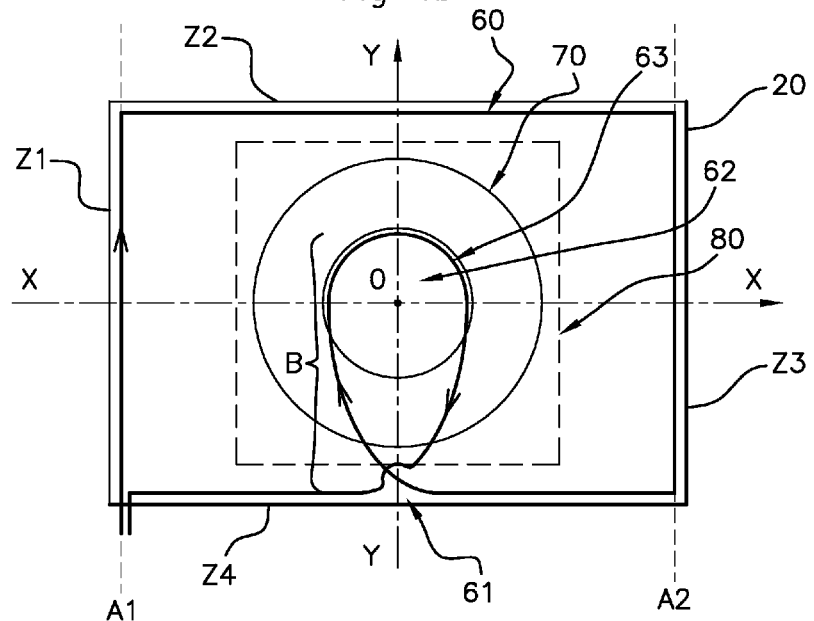

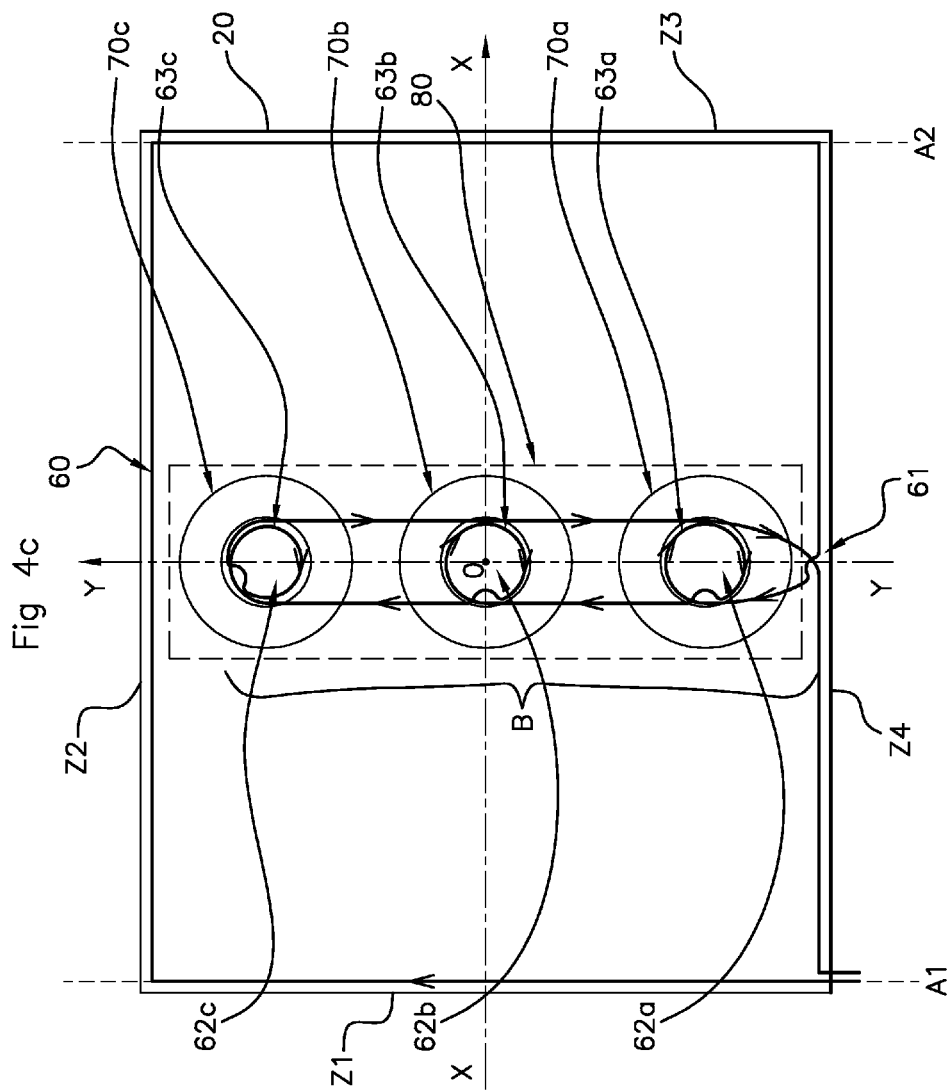

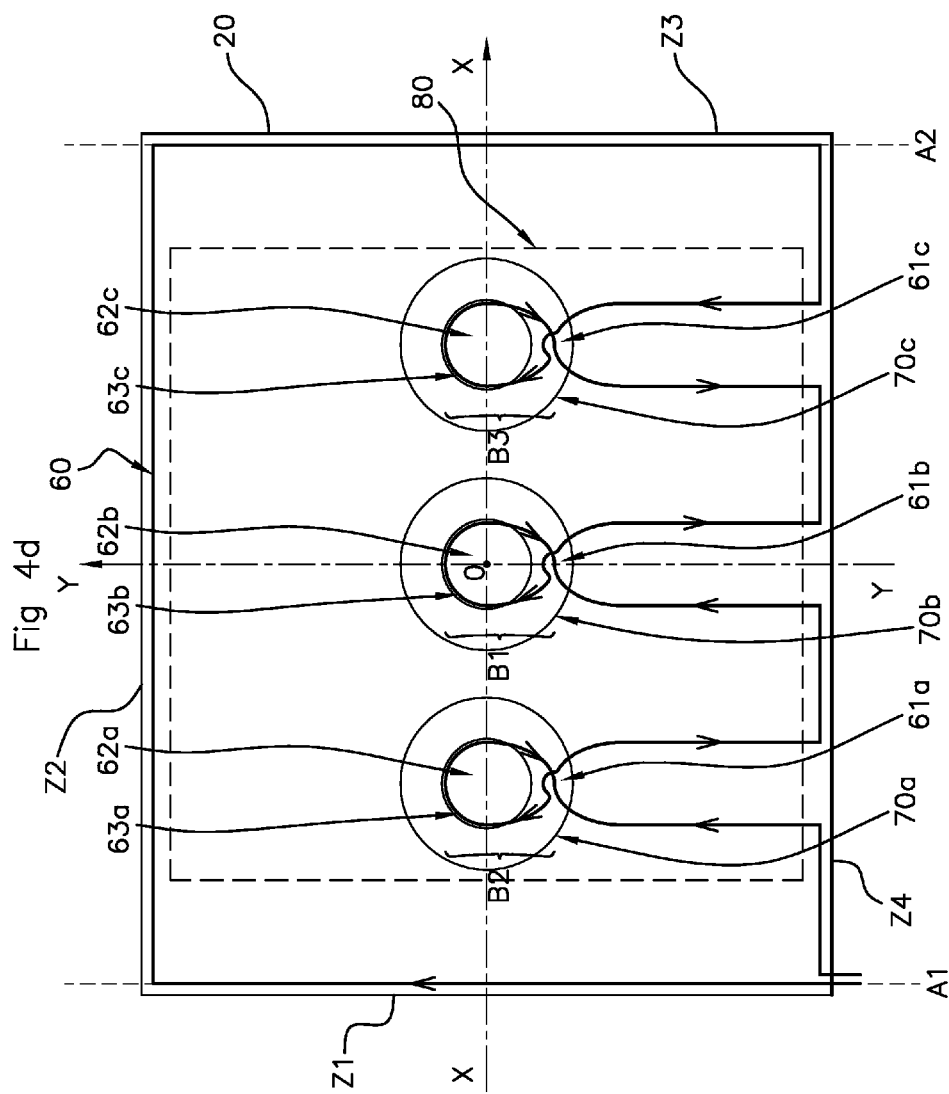

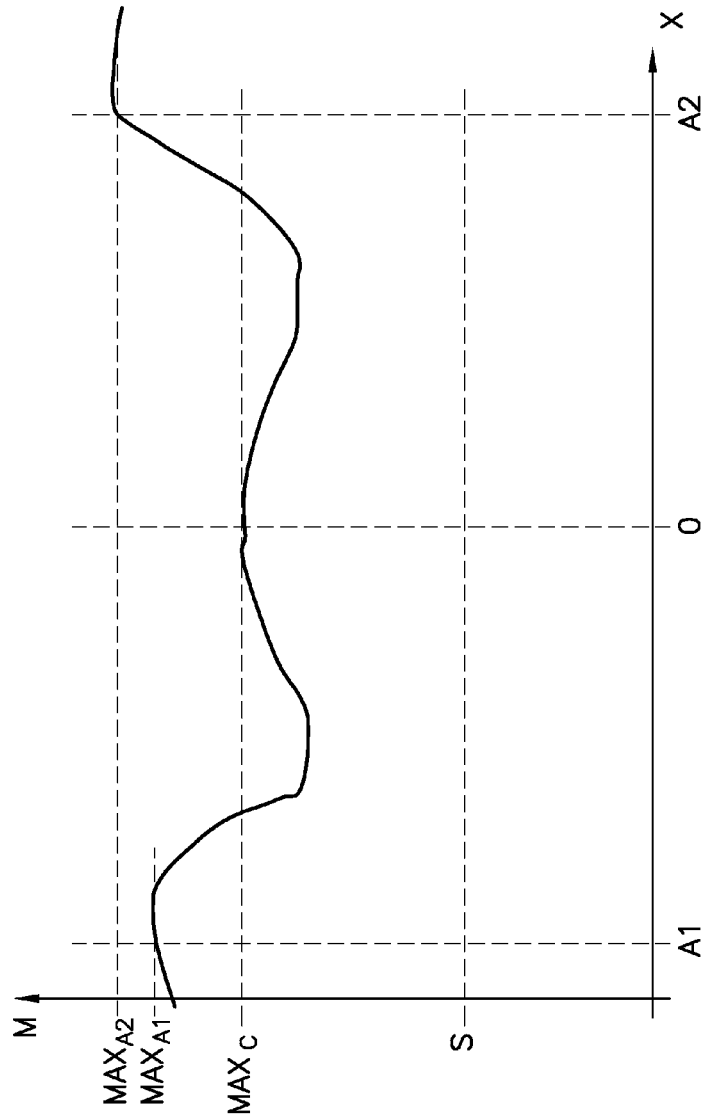

INDUCTIVE CHARGING DEVICE FOR A PORTABLE APPARATUS INCORPORATING A NEAR-FIELD COMMUNICATION ANTENNA

The invention relates to an inductive charging device for a portable apparatus incorporating a near-field communication antenna. In particular, the invention relates to onboard inductive charging devices in automobile vehicles allowing both charging of and/or communication with portable devices such as a mobile telephone or a device for hands-free access to the vehicle (for example, a badge, or a remote control, etc.) via a near-field communication.

A known solution is to place the portable apparatus on a charging device or charger, in other words on a dedicated receptacle, so that the portable apparatus is charged by induction, in other words by magnetic coupling, and so that it communicates at the same time or after the charging period by near-field communication or NFC with the onboard electronic system of the vehicle. This wireless communication over a short distance (generally of the order of a few millimeters), amongst other things, allows the vehicle to download a profile of a particular user contained in the mobile telephone and thus to adapt elements of the vehicle as a function of this profile; for example, to adjust the position of the driver's seat of the vehicle, to program preferred radio stations, to modify the appearance of the dashboard, or to activate the "E-call" (Emergency call) function, etc.

In a known manner, these inductive charging devices comprise a radio-frequency antenna dedicated to the inductive charging, called charging antenna, of the WPC type ("Wireless Power Consortium", in other words a wireless inductive charging antenna complying with the standards of this consortium), allowing an inductive charging in the frequency range of 100 to 200 kHz. The shape and the dimensions of this charging antenna are fixed by this WPC international standard. The size of this charging antenna is relatively large, of the order of a few centimeters. It generally takes the form of a loop, for example round, oval, hexagonal, rectangular, or square, centered in the middle of the charging device. It has a cut-out in its center. The frequency of this charging antenna, of the WPC type, does not allow any exchange of information or any communication with the portable apparatus via near-field communication. It is therefore necessary and a known solution to incorporate into the same charging device another antenna of higher frequency, generally of around 13.56 MHz, dedicated to this near-field communication. Any other radio-frequency antenna may be used that allows short-distance communication between the portable apparatus and the charging device connected to the onboard electronic system of the vehicle. Since the form of the charging device is fixed by constraints for integration into the vehicle, and the size and the dimensions of the charging antenna are fixed by the WPC standard, there generally remains little room for integrating this near-field communication antenna into the same device.

According to the prior art, in FIG. 1, a top view of an inductive charging device 20 for a portable apparatus 30 (cf. FIG. 2) is shown. This charging device 20 is situated in an automobile vehicle (not shown), for example fixed on a dashboard 10 (cf. FIG. 2).

The charging device 20 comprises a charging antenna 70 of the WPC type, with a round shape (cf. FIG. 1), centered in the middle of the charging device 20 and having in its center a cut-out 62. It also comprises a communication antenna 60, in this example, of the integrated NFC type, disposed in such a manner as to take, for example, the shape of the internal periphery of the charging device 20 (cf. FIG. 1). In the case of a charging device 20 with a rectangular or square shape, a known solution is to dispose a charging antenna 70 of the WPC type in its middle, then the communication antenna 60 of the NFC type along the four sides Z1, Z2, Z3, Z4 of the internal periphery of the charging device 20 (cf. FIG. 1). Other shapes of the communication antenna 60 of the NFC type may of course be envisioned depending on the shape of the charging device 20 and depending on the characteristics of the desired NFC communication.

The portable apparatus 30 (cf. FIG. 2) comprises a charger 40 which receives, by magnetic coupling, the inductive charging sent by the charging antenna 70 of the WPC type and an NFC communication antenna 50 which receives the data sent by the communication antenna 60 of the NFC type of the charging device 20. The portable apparatus 30 also comprises an electronic system (not shown) allowing the management of the charging with electricity and the information received via the near-field communication.

A relatively small distance "d", of the order of a few millimeters (cf. FIG. 2) at the most, is needed in order to provide the communication between the portable apparatus 30 and the charging device 20. This allows, on the one hand, the charging at low frequency (between 100 and 200 Hz) to be provided by means of the charging antenna 70 of the WPC type and, on the other hand, the provision of the exchange of data with the vehicle at a higher frequency (13.56 MHz) by means of the communication antenna 60 of the NFC type.

The charging antenna 70 of the WPC type therefore has nearby a higher-frequency communication antenna 60 of the NFC type. This presence must ideally be possible with no coupling between the two antennas or deterioration of the performances of one or the other antenna.

Figure 3:
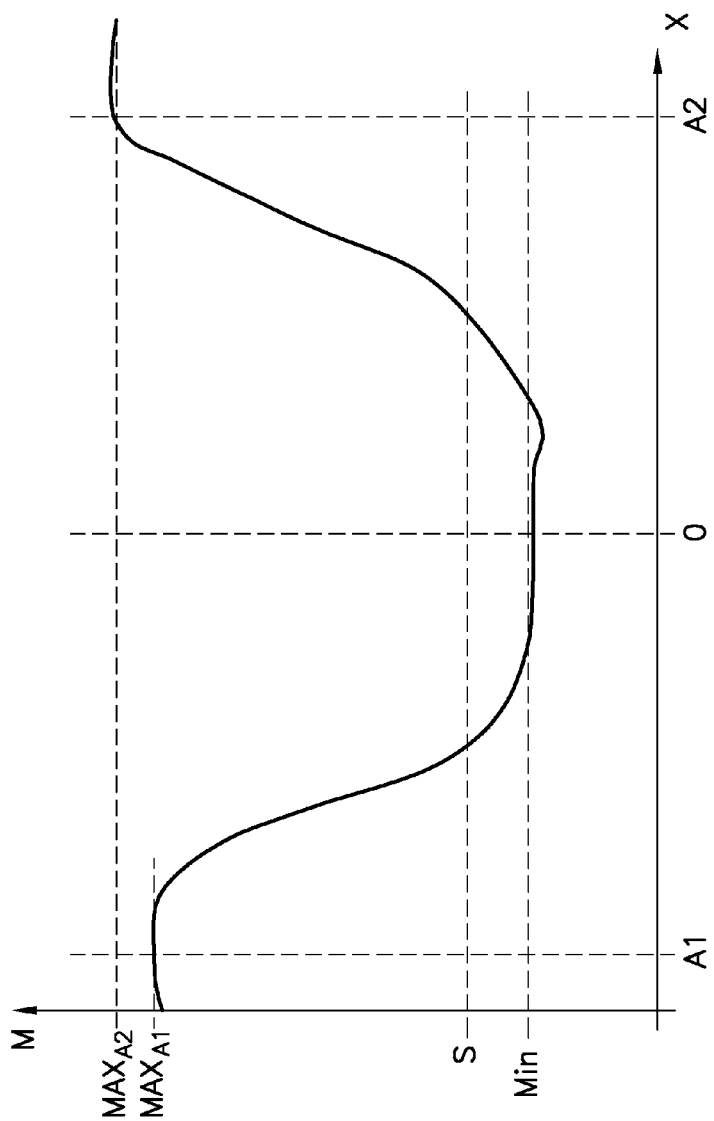

In FIG. 3, the performance of the communication antenna 60 of the NFC type is illustrated along the X axis in FIG. 1 in the presence of the charging antenna 70, according to the prior art. The magnetic coupling M produced by this communication antenna 60 of the NFC type has two substantially equal maximum values, one $MAX_{A1}$ at the position A1, the other $MAX_{A2}$ at the position A2, in other words at the ends A1, A2 of the charging device 20 along the X axis (cf. FIG. 1). This magnetic coupling M also exhibits a minimum Min at the center O of the charging device 20. The presence at the center of the charging device 20 of a charging antenna 70 of the WPC type of non-negligible size therefore impacts the performance of the communication antenna 60 of the NFC type situated around this charging antenna 70. Its field of magnetic radiation is not uniform over the surface area of the charging device 20 (cf. FIG. 3). It has a high amplitude at the ends A1, A2 of the charging device 20, where the communication antenna 60 of the NFC type is located and has a much lower amplitude at the center C (cf. FIGS. 1 and 3) where it reaches a minimum Min. This region with low amplitude of the magnetic field M, around the minimum Min, is referred to as shadow region. When it is situated above the charging device 20, the portable apparatus 30 does not therefore receive the magnetic field M emitted by the communication antenna 60 of the NFC type in a uniform manner over the whole surface of said device.

Figure 2:
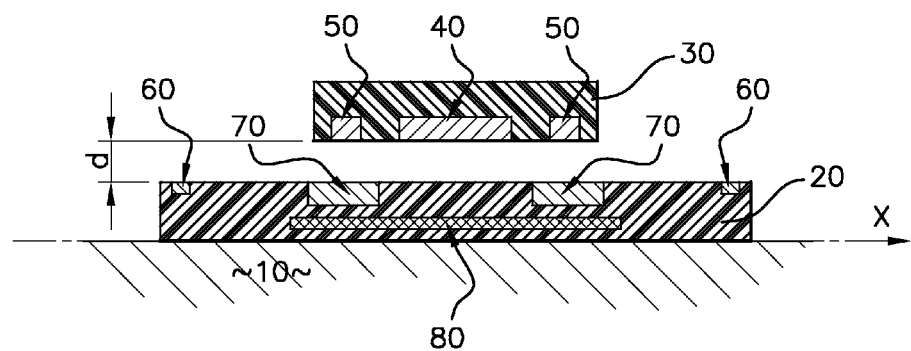

When the user puts his portable apparatus 30 on the charging device 20, as illustrated in FIG. 2, the communication NFC between the portable apparatus 30 and the charging device 20 is then very sensitive to the relative position of the portable apparatus 30 with respect to said device 20 because of this shadow region. More precisely, the relative position between the communication antenna 60 of the charging device 20 and the NFC communication antenna 50 of the portable apparatus 30 affects the quality of the magnetic coupling between the two antennas. This is a drawback since the minimum value Min of the magnetic field coming from the communication antenna 60 of the NFC type is reached in the middle of the charging device 20, where the user must precisely place or center his portable apparatus 30. Consequently, if the portable apparatus 30 is correctly placed on the charging device 20 so as to be charged, it is less so for communicating with it and vice versa.

This phenomenon is amplified in certain charging devices 20, which comprise a magnet or a ferrite 80 disposed underneath the charging antenna 70 (cf. FIG. 2). This ferrite 80 made of magnetic material has a surface area that is substantially larger than the surface area of the charging antenna 70 of the WPC type and generally takes the form of a square, or rectangle, centered in the middle of the device, as is the charging antenna 70.

The ferrite 80 provides a shielding function; it prevents the magnetic field of the charging antenna 70 of the WPC type from propagating toward the dashboard 10, and redirects this field in the direction of the portable apparatus 30.

In these devices, another magnet is disposed in the portable apparatus 30 and guides the user, by magnetic attraction between the two elements, to the correct positioning of the portable apparatus 30 with respect to the charging device 20, in other words generally in the center of the latter, where the magnetic field emitted by the communication antenna 60 is unfortunately the weakest as explained hereinabove.

Thus, the communication between the charging device 20 and the portable apparatus 30 depends on the detection threshold S of this portable apparatus 30 in order to establish an NFC communication. If this threshold, which is determined in order to be below the maximum values $MAX_{A1}$ and $MAX_{A2}$, is above the minimum Min of the magnetic field M emitted by the communication antenna 60 of the NFC type (that it receives when it is positioned in the center of the charging device 20), there is then no communication possible between the charging device 20 and the portable apparatus 30.

Moreover, certain charging devices 20 are designed to accept various types of portable devices, not all having the same detection threshold S for establishing an NFC communication, so it is possible that the detection threshold S of one of these devices is above the minimum value Min of the magnetic field emitted by the communication antenna 60 of the NFC type.

There are therefore obvious problems of integration of a near-field communication antenna with an inductive charging antenna into a given charging device for a portable apparatus.

It is these problems that the invention aims to solve.

The invention provides an inductive charging device of a portable apparatus for an automobile vehicle comprising at least:
  one antenna for inductive charging, called charging antenna of the WPC type having a cut-out at its center and
  one antenna for communicating, called communication antenna, of the NFC type, disposed at least around the charging antenna, along sides of the charging device, and comprising at least one winding,
the invention residing in the fact that:
  on at least one of the sides of the charging device, the communication antenna forms at least one loop having at least one crossing point on its base, and at least one upper part which surrounds the center of the cut-out of the charging antenna and
  the upper part of the loop of the communication antenna surrounding the center of the cut-out has at least one winding.

Judiciously, the at least one crossing point and the at least one upper part of the communication antenna are symmetrical with respect to an axis passing through the charging device at its center and perpendicular to the side.

Preferably, the number of crossing points is odd.

Advantageously, the number of windings of the at least one upper part of the communication antenna surrounding the center of the cut-out is greater than the number of windings of the communication antenna situated around the at least one charging antenna.

According to a first embodiment, the charging device furthermore comprises a ferrite, situated substantially underneath the at least one charging antenna whose surface area is substantially greater than the surface area of the at least one charging antenna.

According to a second embodiment, the device comprises a plurality of charging antennas and the communication antenna forms at least one loop having on its base at least one crossing point and whose upper parts respectively surround the center of each cut-out of each charging antenna and the charging antennas are aligned along an axis passing through them and perpendicular to the side on which the loop of the communication antenna of the NFC type is located.

In a third embodiment:
  the charging antennas are aligned along an axis passing through them,
  the communication antenna has a plurality of loops each having at least one crossing point and whose upper parts respectively surround the center of each cut-out,
  and the axis is parallel to the side on which the plurality of loops is located.

The invention also relates to any automobile vehicle comprising an inductive charging device according to the features described hereinabove.

Figure 5B:
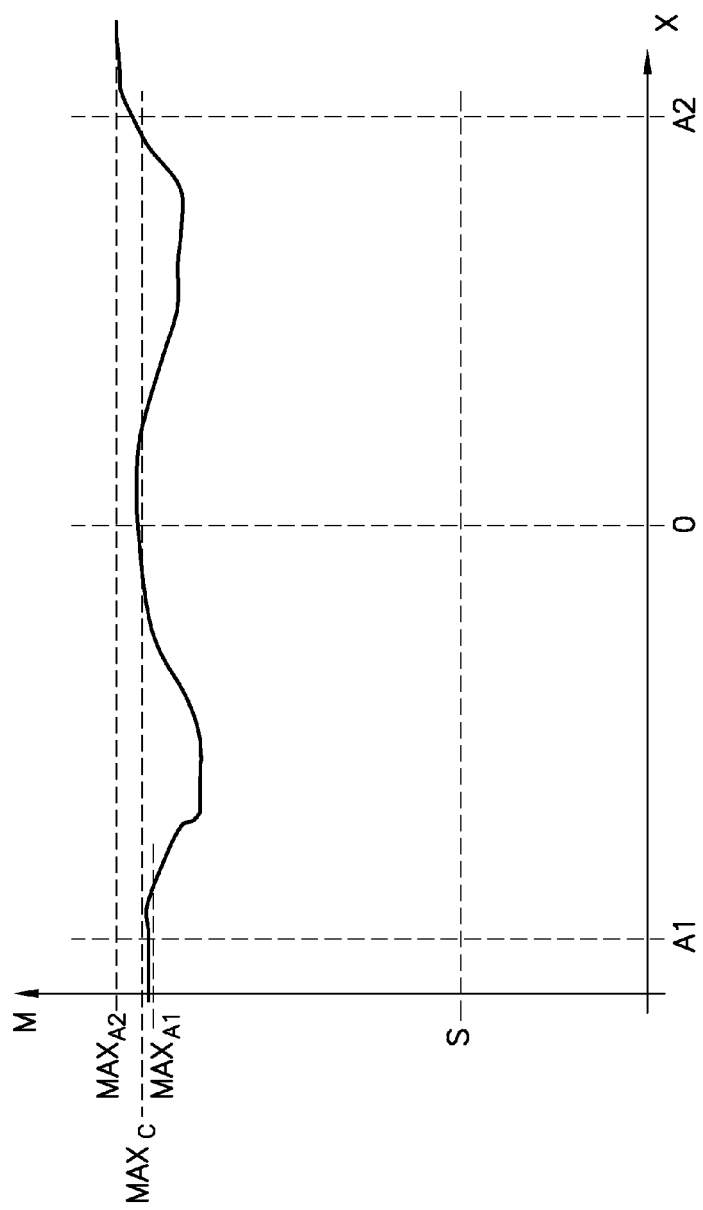

Other subjects, features and advantages of the present invention will become more clearly apparent from the description that follows by way of example of a non-limiting embodiment, presented with reference to the appended schematic drawings on which:

FIG. 1 shows a top view of the inductive charging device incorporating a near-field communication antenna, according to the prior art, FIG. 2 shows a cross-sectional view of the inductive charging device along the X axis in FIG. 1 and incorporating a near-field communication antenna according to the prior art, together with the portable apparatus disposed on top of this device, FIG. 3 shows, according to the prior art, the magnetic field emitted by the communication antenna of the NFC type along the cross section X-X in FIG. 1, FIG. 4a shows the inductive charging device incorporating a communication antenna of the NFC type, according to a first embodiment of the invention, FIG. 4b shows the inductive charging device incorporating a communication antenna of the NFC type, according to a second embodiment of the invention, FIG. 4c shows the inductive charging device incorporating a communication antenna of the NFC type, according to a third embodiment of the invention, FIG. 4d shows the inductive charging device incorporating a communication antenna of the NFC type, according to a fourth embodiment of the invention, FIG. 5a shows the magnetic field emitted by the communication antenna of the NFC type along the cross section X-X in FIG. 4a, FIG. 5b shows the magnetic field emitted by the communication antenna of the NFC type along the cross section X-X in FIG. 4b.

The solution of the invention is to modify the shape of the communication antenna 60 of the NFC type according to FIG. 4a. On three of the four sides Z1, Z2, Z3 of the charging device 20, the communication antenna 60 of the NFC type is disposed, for example, according to the internal periphery of the charging device 20, as in the prior art. On the fourth side Z4, according to the invention, the communication antenna 60 of the NFC type forms a loop B having a crossing point 61 on its base and whose upper part 63 surrounds with at least one winding the center of the cut-out 62 of the charging antenna 70 of the WPC type.

The communication antenna 60 of the NFC type on this fourth side Z4 therefore has a loop B composed of at least one crossing point 61 (without interconnection) on its base and of an upper part 63 wound around the center of the cut-out 62.

Preferably, the crossing point 61 is situated on the Y axis and the upper part 63 is symmetric with respect to a transverse Y axis of the charging device 20 which passes through it at its center O and which is perpendicular to the side on which the loop B is located. In FIG. 4a, this is an axis perpendicular to the fourth side Z4.

The crossing point 61 of the communication antenna 60 of the NFC type on its base is important in that it allows the current flowing in the loop B of the communication antenna 60 of the NFC type to be oriented in the same direction as the current flowing in the remainder of this communication antenna 60, in other words in the part of this communication antenna 60 situated at the internal periphery of the charging device 20 on the three other sides Z1, Z2, Z3, and hence the two magnetic fields M1 and M2 respectively created by the flow of these currents (illustrated by arrows in FIG. 4a) are oriented in the same direction and do not cancel each other. The crossing point 61 may consist of a single crossing point or of an odd number of crossing points.

Advantageously, the number of windings that form the upper part 63 of the communication antenna 60 of the NFC type around the center O of the cut-out 62 of the charging antenna 70 is greater than the number of windings of the communication antenna 60 around the charging antenna 70, in other words greater than the number of windings located along the internal periphery of the charging device 20.

For example, the number of windings of the communication antenna 60 of the NFC type around the center of the cut-out 62 is greater than three, whereas the number of windings of the communication antenna 60 of the NFC type is equal to two.

FIG. 4a only shows a single loop B formed by the crossing point 61 and the upper part 63. However, another loop B can be formed in the same manner on the opposite side Z2 to this fourth side Z4, or even on all the sides Z1, Z2, Z3, Z4.

Preferably, the loop B is symmetrical with respect to the axis passing through it and which is perpendicular to the side on which it is located.

FIG. 5a shows the performance of the communication antenna 60 of the NFC type according to the invention, as shown in FIG. 4a. The magnetic field M emitted by the communication antenna 60 of the NFC type, according to the invention, has a more uniform shape along the X axis than the field emitted in the prior art (cf. FIG. 3). At the center O of the charging device 20, there is a local maximum $MAX_C$, which comes close in value to the maximum values $MAX_{A1}$ and $MAX_{A2}$ reached at the ends A1 and A2 of the charging device 20 and which is much greater than the minimum Min obtained with the device of the prior art (cf. FIG. 3).

This local maximum $MAX_C$ is greater than a detection threshold S for the portable apparatus 30. The communication between the portable apparatus 30 and the charging device 20 is therefore ensured, even when the portable device 30 is situated at the center of the charging device 20.

According to a second embodiment (cf. FIG. 4b), a ferrite 80 is disposed underneath the charging antenna 70 of the WPC type, and has a surface area slightly larger than that of the charging antenna 70 of the WPC type.

Advantageously, the presence of this magnetic ferrite 80 has a positive impact on the magnetic field M produced by the communication antenna 60 of the NFC type disposed according to the invention. In particular, the ferrite 80 amplifies the magnetic field M produced at the center of the charging device 20 by the winding of the upper part 63 of the communication antenna 60 of the NFC type.

FIG. 5b illustrates the magnetic field M produced by the communication antenna 60 of the NFC type shown in FIG. 4b, according to the invention and in the presence of the ferrite 80. The maximum $MAX_C$ reached in the center C of the charging device 20 has, in this case, a value substantially equal to the maxima $MAX_{A1}$ and $MAX_{A2}$ reached at the ends A1 and A2 of the charging device 20. The magnetic field M of the communication antenna 60 of the NFC type on the surface of the charging device 20 therefore has a value that is substantially uniform along the X axis.

The detection threshold S for the portable apparatus 30 disposed on top of the device is now much lower than the magnetic field M produced by the communication antenna 60 of the NFC type disposed according to the invention in the presence of ferrite, and this is true whatever the value of X. The near-field communication between the portable apparatus 30 and the charging device 20 is therefore ensured irrespective of the relative position between the charging device 20 and the portable apparatus 30, and this is true for any given portable apparatus having a detection threshold S lower than the maximum values of the magnetic field $MAX_{A1}$ and $MAX_{A2}$.

According to a third embodiment (cf. FIG. 4c), the charging device 20 comprises a plurality of charging antennas 70a, 70b, 70c of the WPC type disposed, for example, along the Y axis, perpendicular to the side Z4. The communication antenna 60 of the NFC type then forms a loop B having, on its base, a crossing point 61 and whose upper parts 63a, 63b, 63c each surround the center of the cut-outs 62a, 62b, 62c of each charging antenna 70a, 70b, 70c of the WPC type. The charging antennas 70a, 70b, 70c are symmetrical with respect to the Y axis passing through them.

This alignment of charging antennas 70a, 70b, 70c of the WPC type may of course be effected on one or more sides Z1, Z2, Z3, Z4 of the charging device 20. There may also be several alignments of charging antennas on a single side, along the X axis, parallel to the side Z4, as is shown in FIG. 4d. In this fourth embodiment, the communication antenna 60 of the NFC type then forms three loops B1, B2, B3 each having on its base a crossing point 61a, 61b, 61c and whose upper parts 63a, 63b, 63c each surround the center of the cut-outs 62a, 62b, 62c of each charging antenna 70a, 70b, 70c of the WPC type. The communication antenna 60 of the NFC type is then symmetrical with respect to the Y axis. In this example, the crossing points 61a, 61b, 61c are respectively localized above each of the charging antennas 70a, 70b, 70c and non-localized close to the side Z4 of the communication antenna 60, as illustrated in FIG. 4a. The location of the crossing points 61a, 61b, 61c on the Y axis can vary, the important point being to obtain an odd number of crossing points and for the loop or loops B1, B2, B3 thus formed to be symmetrical with respect to an axis passing through them.

The reason for multiplying the number of charging antennas 70a, 70b, 70c is due to the uniformization of the magnetic field produced by these antennas at the surface of the device. The inductive charging is thus rendered as insensitive as possible to the relative position between the portable apparatus 30 and the charging device 20. The charging antennas may be disposed in a random fashion within the charging device.

The invention therefore allows the problems of integration and of interference between a near-field communication antenna and a charging antenna, situated within the same charging device, to be overcome while guaranteeing a good communication by means of the NFC antenna.

In particular, the invention allows the performance of the NFC communication antenna to be improved with respect to the prior art in order to enable a satisfactory communication between the portable apparatus and the charging device whatever the position of the portable apparatus with respect to the charging device.

The invention is not limited to the embodiments described. In particular, the invention is applicable to all types of radiofrequency communication having antennas with different designs and having a coupling with one or more charging antenna(s).

The invention claimed is:

1. An inductive charging device for a portable apparatus for an automobile vehicle comprising at least:
   one antenna for inductive charging, called charging antenna, having a cut-out at its center and,
   one antenna for communicating, called communication antenna, disposed around at least the charging antenna, along sides of the charging device and comprising at least one winding,
   said device being characterized in that:
   on at least one of the sides of the charging device, the communication antenna forms at least one loop having at least one crossing point on its base, the loop of said communication antenna having at least one upper part surrounding the center of the cut-out of the charging antenna,
   the upper part of the loop of the communication antenna surrounding the center of the cut-out has at least one winding, and
   the number of windings on the upper part of the communication antenna surrounding the center of the cut-out is greater than the number of windings on the communication antenna situated around the charging antenna.

2. An automobile vehicle comprising an inductive charging device as claimed in claim 1.

3. The device as claimed in claim 1, characterized in that the crossing point and the upper part of the communication antenna are symmetrical with respect to an axis passing through the charging device at its center and perpendicular to the side.

4. The device as claimed in claim 1, characterized in that the number of crossing points is odd.

5. An inductive charging device for a portable apparatus for an automobile vehicle comprising at least:
   one antenna for inductive charging, called charging antenna, having a cut-out at its center,
   one antenna for communicating, called communication antenna, disposed around at least the charging antenna, along sides of the charging device and comprising at least one winding, and
   a ferrite, situated substantially underneath the charging antenna whose surface area is substantially greater than the surface area of the charging antenna,
   said device being characterized in that:
   on at least one of the sides of the charging device, the communication antenna forms at least one loop having at least one crossing point on its base, the loop of said communication antenna having at least one upper part surrounding the center of the cut-out of the charging antenna, and
   the upper part of the loop of the communication antenna surrounding the center of the cut-out has at least one winding.

6. The device as claimed in claim 5, characterized in that the crossing point and the upper part of the communication antenna are symmetrical with respect to an axis passing through the charging device at its center and perpendicular to the side.

7. The device as claimed in claim 5, characterized in that the number of crossing points is odd.

8. An automobile vehicle comprising an inductive charging device as claimed in claim 5.

9. An inductive charging device for a portable apparatus for an automobile vehicle comprising at least:
   one antenna for inductive charging, called charging antenna, having a cut-out at its center,
   one antenna for communicating, called communication antenna, disposed around at least the charging antenna, along sides of the charging device and comprising at least one winding, and
   a plurality of charging antennas,
   wherein:
   on at least one of the sides of the charging device, the communication antenna forms at least one loop having at least one crossing point on its base, the loop of said communication antenna having at least one upper part surrounding the center of the cut-out of the charging antenna,
   the upper part of the loop of the communication antenna surrounding the center of the cut-out has at least one winding, and
   the communication antenna forms at least one loop having, on its base, at least one crossing point and whose upper parts respectively surround the center of each cut-out of each charging antenna.

10. The device as claimed in claim 9, characterized in that the plurality of charging antennas is aligned along an axis passing through them and perpendicular to the side on which the loop of the communication antenna is located.

11. The device as claimed in claim 9, characterized in that:
    the charging antennas are aligned along an axis passing through them,
    the communication antenna has a plurality of loops each having at least one crossing point and whose upper parts respectively surround the center of each cut-out, and
    the axis is parallel to the side on which the plurality of loops is located.

12. The device as claimed in claim 9, characterized in that the crossing point and the upper part of the communication antenna are symmetrical with respect to an axis passing through the charging device at its center and perpendicular to the side.

13. The device as claimed in claim 10, characterized in that the crossing point and the upper part of the communication antenna are symmetrical with respect to an axis passing through the charging device at its center and perpendicular to the side.

14. The device as claimed in claim 11, characterized in that the crossing point and the upper part of the communication antenna are symmetrical with respect to an axis passing through the charging device at its center and perpendicular to the side.

15. The device as claimed in claim 9, characterized in that the number of crossing points is odd.

16. An automobile vehicle comprising an inductive charging device as claimed in claim 9.

* * * * *